(No Model.)
E. M. THOMPSON.
SHIPPING CASE.
No. 450,435. Patented Apr. 14, 1891.
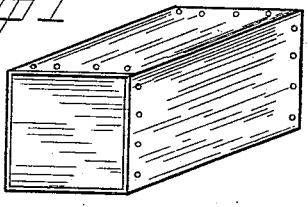
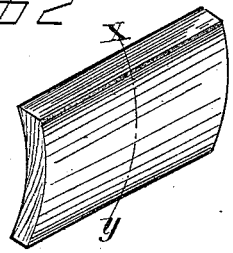
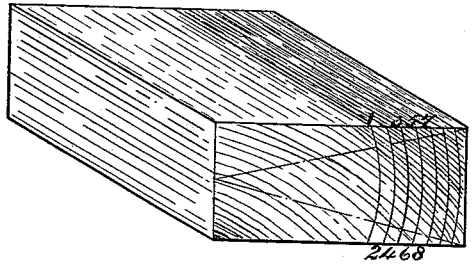
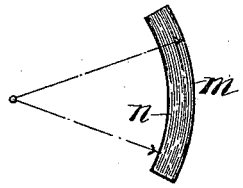
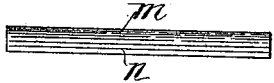
WITNESSES.
INVENTOR
Evert M. Thompson
THE NORRIS PETERS CO., PHOTO-LITHO., WASHINGTON, D. C.

UNITED STATES PATENT OFFICE.

EVERT M. THOMPSON, OF INDIANAPOLIS, INDIANA.

SHIPPING-CASE.

SPECIFICATION forming part of Letters Patent No. 450,435, dated April 14, 1891.

Application filed December 4, 1890. Serial No. 373,535. (No model.)

*To all whom it may concern:*

Be it known that I, EVERT M. THOMPSON, a citizen of the United States, residing at Indianapolis, in the county of Marion and State of Indiana, have invented certain new and useful Improvements in Shipping-Cases; and I do hereby declare the following to be a full, clear, and exact description of the invention, such as will enable others skilled in the art to which it appertains to make and use the same.

My invention relates, primarily, to the construction of cases for cold-storing and shipping eggs and packing and shipping dressed poultry, and, secondarily, to cases for the shipment of fruits and other articles requiring the protection of a substantial inclosing case.

As is well known, one great expense incident to cold-storing eggs in boxes arises from the action upon the boxes of the unavoidable moisture of the atmosphere of the cold rooms. The boxes must be made of seasoned or dry box-boards, primarily as green box-boards would impart objectionable flavor to the sensitive eggs. These dry boxes readily absorb the moisture of the enveloping atmosphere, with the result that the boards bulge, warp, and break loose from the nail-fastenings, the boxes being thus rendered unfit for shipment. The same is true of boxes during shipment to market if exposed to rain or snow or if containing poultry packed with ice or other wet produce. Boxes can be made strong enough from the usual sawed boards to withstand the action of moisture, but the heavy box-boards, large nails, band-iron, &c., usually employed in such cases are all expensive not only as to first cost, but as to freights, for these heavy packages greatly add to freight expenses.

Now the object of my invention is to provide lighter, cheaper, and equally efficient cases than now used in the shipping of eggs, poultry, fruits, and merchandise.

The cold-storing and shipment of eggs is a vast industry, ranking with the cereal and fruit products of agriculture. Therefore any improvement in the ways and means employed contributes largely to the benefits of the public. It is with especial reference to the cold-storing and shipping of eggs that I have devised my improvement, though it applies with efficiency to the packing and shipping of dressed poultry, fruits, and merchandise.

In the drawings, Figure 1 represents an ordinary square box formed of box-boards nailed together. As shown by the position of the nails, the box ends are thicker than the box sides, and this is my preferred form of construction. Fig. 2 represents in perspective a curve-cut board before the same is flattened and the arrangement of fibers readjusted. Fig. 3 represents a block of wood of any desired shape from which these box-boards are formed by cutting through the curved lines 1 2 3 4, &c., all the said curves having the same axis, which is parallel with the grain of the block. It should be observed that the curved line 1 2 has a shorter radius than that of the curved line 3 4 and that this has a shorter radius than 5 6. This constantly decreasing of the radii and the center of curvature remaining the same are essential to the preservation of the uniformity of the thicknesses of the boards. Fig. 4 shows a cross-section $x\,y$ of the box-board, Fig. 2, as it is cut from the block, the outer or first cut surface being a curve of longer radius than the inner surface. It illustrates how the fibers of the wood have the same relation to each other that they had before the board was severed from the block. Fig. 5 is the cross-section of the same board after it is flattened out by piling and weighting down and left in this flat state until seasoned. After thus seasoning it may be removed and will remain flat. The figure also shows the changed or readjusted condition of the fibers of the board. The flattening causes the fibers in and at the outer surface $m$, Fig. 4, to become more dense and those in and at the inner surface $n$, Fig. 4, to become less dense. This result is apparent, as the outer surface is the longer curve, and by flattening both surfaces are made to become lines of equal length.

The amount of curvature in a board should be greater or less, according as the condensation of fiber desired is greater or less in the flattened board, in such proportion that there will be an equilibrium in the expansion of the two surfaces of the board when exposed to moisture. This effect in the board may be secured either by advancing the block to the knife revolving around a constant center or by advancing the knife to the block revolving around a constant center in such a way as that the knife shall cut a board of uniform thickness from the block.

An ordinary sawed board sawed in straight lines from a log on being seasoned and one side of it exposed to moisture will bulge out with great force toward the side of application of the moisture, and what is peculiar is that howsoever long the application of the moisture to the one side it will not get straight again. The filled interstices of the fiber withstand the capillary attraction of the unfilled interstices adjoining to a degree that prevents the perfectly equal distribution of the moisture. In a degree moisture will pervade the entire substance of the board, but the excess will remain in the side toward the exposure. Hence the bulge will remain until the moisture is entirely evaporated; but the burst box is permanently unfitted for shipment. In order to prevent the boards from thus bulging, warping, and bursting from their nail-fastenings, I employ boards that are more dense in the substance of one side than in the other, on principle that the dense side will expand as much from the small amount of moisture that reaches it by passing through the exposed side as the less dense side will expand with the greater amount of moisture contained in its interstices. I obtain such boards by cutting them from a block of any form desirable, the line described by the knife as it passes through the substance of the block being a curved line, Fig. 3, each passing of the knife through adjacent fiber being constantly a curve of a diameter as much less than the curve described by the preceding cut as the thickness of the boards shall demand. The less the decrease of the radius the thinner the board will be. Boards thus obtained I flatten and dry, the result being boards the fiber of which on one side is more dense than on the other. Boards so treated by cutting on curves approximating the direction of the rings representing the growth of the timber and then flattening have sometimes been known under the name of "veneers." This term I consider incorrect in describing my lumber, and such lumber I have designated "readjusted" lumber. The fibers in the two faces of the boards are readjusted or rearranged in such manner that the fibers on one face of the lumber are abnormally compressed and the fibers on the other face are measurably loosened or opened. The measure to which the fibers are compressed on one side of the board and loosened on the other is of course dependent on the curve on which the cuts are made and also on the thickness of the boards. If the average or central curvature of the cut pieces be the same, it is evident that the compression on one face and expansion on the other will be greater when thick pieces are flattened than with thin pieces. From these boards I form the entire frame of the box by nailing them together, so that the denser surfaces are not on the side of exposure to the moisture, and by the words "frame of the box" I mean the two sides and two ends exclusive of the top and bottom. If the box is to be used for cold-storing, I put the dense side of the boards inward. If it is to be used for shipping wet produce, as poultry packed in ice, then I put the dense sides of the boards outwardly, the reason of this being that when the moisture enters by the less dense side of the board expansion on that side will not be in excess of the expansion of the more dense side into which the lesser amount of moisture enters, and the board therefore will not bulge and warp and break from the nail-fastenings. Compressed wood will increase a greater increment with the addition of a certain amount of moisture than if uncompressed, or the reverse, and compressed wood will expand from the addition of little moisture as much as uncompressed wood will expand from the addition of proportionally more moisture. It is evident that one side of these boards bears the relation to the other that compressed wood does to uncompressed. By exposing, then, the less dense side of the boards to the moisture I get an even expansion of the whole mass of the boards. As boards expand and contract only across the grain, it follows that to obtain the best results the ends of the boxes should be so nailed in that the grain of the ends will run with the grain of the sides, so that the expansion of the ends and sides will be together, the box being effected by such expansion only in the depth being increased. When the side pieces are nailed to the end pieces, the box sides are firmly supported on the inside by the box ends and are held down on the outside by the nail heads; but the box ends are supported only by the nails which enter said ends, and as the nails must be held firmly to make a substantial box it is desirable that the box ends be thicker and more substantial than the box sides. As has been explained, the thicker pieces of the readjusted lumber used for box ends will have a greater difference in density between the two surfaces than the thinner side pieces of the box. The grain in the ends may run vertically, while that of the sides may run horizontally; but though the box will stand ordinary exposure, yet where the moisture is great the sides will bulge, because being freely exposed to the moisture they will expand in width, whereas the ends with grain vertical to the horizontal grain of the sides cannot expand lengthwise, and thus go with the sides.

As a box composed of boards having one side more dense in the fiber than the other is superior for the purposes set forth to a box having the ends made of ordinary flat boards, even though the ends of the former are inserted so that their grain is vertical to the horizontal grain of the sides, therefore I do not confine the application of my invention to boxes having the grain of both the ends and sides running horizontally, but include both the constructions herein described.

Though the primary merits of my invention lay in making cold-storage cases of curve-cut lumber, yet I do not confine my invention to these, inasmuch as solid curve-cut boards are far more economically produced than the common ordinary sawed boards. Therefore it follows that many kinds of shipping-cases not necessarily designed for exposure to moisture can be best made from curve-cut boards. To illustrate briefly, when a log is sawed, as is most always the case, into inch-boards the saw cuts a kerf seldom less than one-fourth-inch wide. Thus one-fourth inch is wasted out of every five-fourths of material—a twenty per cent. waste. Now if this board is to be resawed into scant one-half-inch boards for boxes, then as the usual resawing necessitates at least a one-eighth-inch kerf there is an additional waste of twelve and one-half per cent., or a total waste of thirty-two and one-half per cent. in getting scant one-half-inch box-boards. Heretofore it has been impracticable to curve-cut heavy box-boards solidly; but this mechanical problem I have solved and will make application for patent on the mechanism employed at an early date. It is essential that the boards be solidly cut in order to produce the best box, and yet they must be susceptible of being flattened out and seasoned without cracking, checking, or splitting on the inner side—a peculiar board produced by a peculiar mechanical contrivance.

As every box rests upon its bottom, the bottom boards are protected from exposure to the moisture of the enveloping atmosphere of the cold-storage rooms, and as boxes are usually piled one upon the other when in cold-storage it follows that tops and bottoms are likewise protected from exposure. It is not essential to my invention that the entire box be composed of boards having one side specifically more compact than the other.

What is essential is that the frame of the box, exclusive of top and bottom, shall invariably be entirely composed of boards cut through annular lines and then flattened, so that these annular surfaces become parallel planes, and by the "frame of the box" I mean the ends and sides only to which as the frame the top and bottom are fastened.

In this specification I do not employ the word "veneer" as descriptive of the boards I use in constructing my boxes, because "veneer" means a thin sheet of wood. I use exclusively boards that may properly be called "cut lumber" in distinction from veneer, in the property of strength not unlike sawed boards, and yet different from them in having one side specifically more dense in the fiber than is the other.

I am aware that boxes are made the sides of which are composed of veneer, but the ends of which are made from the ordinary straight-sawed lumber, which has not the fiber in one side specifically more dense than that in the other. That construction of a box I do not claim.

I am aware that small boxes designed for berries and small fruits and holding usually about one quart each are made of veneer bent into form, the ends and sides being integral; but that method and device I do not claim. Nor do I claim my invention as being applicable to any box that does not serve the purpose of a shipping-case for protecting small veneer and paper boxes, other frail articles, produce, and merchandise from the hardships of transportation to market by the public carriers.

Using nails, as I do invariably, the practical construction of my case necessitates that the ends shall be amply thick to form a firm anchorage for the nails driven into their edges, and economy requires that the sides shall not be so thick as the ends, in order to save weight and materials. Therefore I do not claim my invention as applicable to those lighter boxes not designed for the purposes of shipping-cases, whether, as above, the sides and ends be integral or not, just so the one thickness composing an end is not of greater thickness than the proper side pieces of the frame; but What I do claim, and for which I desire Letters Patent, is—

1. A shipping case or box the ends of which each consist of a single thickness of lumber readjusted as to its fiber, so that one face is less compact than the normal condition of the wood and less dense than the other face, and the box sides having a single thickness of similarly-readjusted lumber less in thickness and having less difference between the density of its faces than the end pieces, said side pieces held to the end pieces by nails, substantially as described.

2. A shipping case or box the ends of which consist of a single thickness of lumber readjusted as to its fiber, so that one face is less compact than the normal condition of the wood and less dense than the other face, and box sides which are composed of similar readjusted lumber, the compact faces of all the readjusted lumber being in the same direction with reference to the interior of the box and all secured together by nails, substantially as described.

3. A shipping case or box the ends of which are composed of lumber readjusted as to its fiber, so that one surface is less dense than the normal wood and less dense than the other face, and side pieces of similar readjusted lumber, the denser faces of all the readjusted lumber being inward, substantially as described.

In testimony whereof I affix my signature in presence of two witnesses.

EVERT M. THOMPSON.

Witnesses:
WM. H. HUBBARD,
WM. MACNAMAR.